(No Model.) 7 Sheets—Sheet 2.

O. KOSZTOVITS.
GAS ENGINE.

No. 448,924. Patented Mar. 24, 1891.

WITNESSES:
E. J. Griswold
John Revell

INVENTOR
Ognieslaw Kosztovits
BY
Howsen and Howsen
his ATTORNEYS.

THE NORRIS PETERS CO., PHOTO-LITHO., WASHINGTON, D. C.

(No Model.) 7 Sheets—Sheet 3.
O. KOSZTOVITS.
GAS ENGINE.

No. 448,924. Patented Mar. 24, 1891.

WITNESSES:
E. J. Griswold
John Revell

INVENTOR
Ognieslaw Kosztovits
BY Howson and Howson
his ATTORNEYS.

(No Model.) 7 Sheets—Sheet 4.

O. KOSZTOVITS.
GAS ENGINE.

No. 448,924. Patented Mar. 24, 1891.

(No Model.) 7 Sheets—Sheet 5.
O. KOSZTOVITS.
GAS ENGINE.
No. 448,924. Patented Mar. 24, 1891.
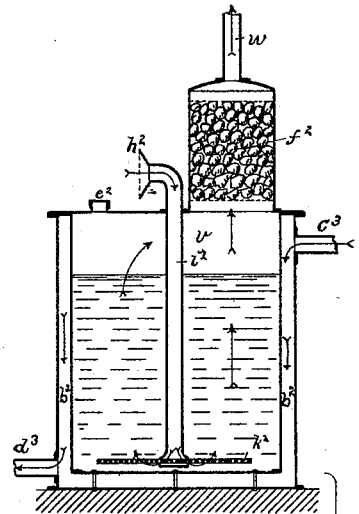
Fig. 15.
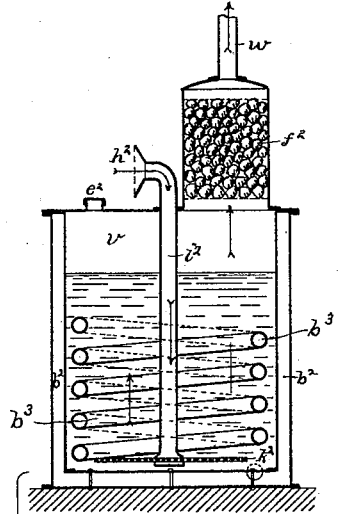
Fig. 16.
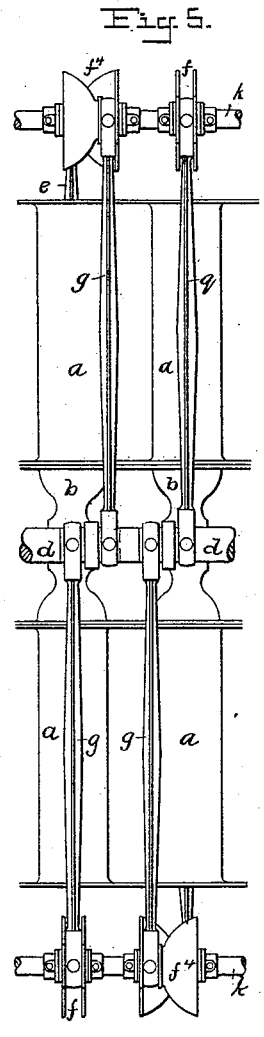
Fig. 5.
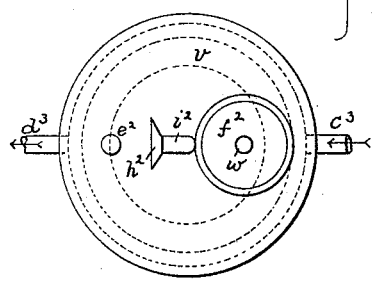
WITNESSES:
E. J. Griswold
John Revell
INVENTOR
Ogneslaw Kosztovits
BY
Howson and Howson
his ATTORNEYS (No Model.) 7 Sheets—Sheet 6.

O. KOSZTOVITS.
GAS ENGINE.

No. 448,924. Patented Mar. 24, 1891.

WITNESSES:
E. J. Griswold
John Revell

INVENTOR
Ognesław Kosztovits
BY Howson and Howson
his ATTORNEYS.

(No Model.) 7 Sheets—Sheet 7.
O. KOSZTOVITS.
GAS ENGINE.

No. 448,924. Patented Mar. 24, 1891.

WITNESSES:
E. J. Griswold
John Revell

INVENTOR
Ognislaw Kosztovits
BY
Howson and Howson
his ATTORNEYS.

THE NORRIS PETERS CO., PHOTO-LITHO., WASHINGTON, D. C.

United States Patent Office.

OGNESLAW KOSZTOVITS, OF ST. PETERSBURG, RUSSIA.

GAS-ENGINE.

SPECIFICATION forming part of Letters Patent No. 448,924, dated March 24, 1891.

Application filed June 22, 1888. Serial No. 277,888. (No model.) Patented in England June 6, 1888, No. 8,273.

*To all whom it may concern:*

Be it known that I, OGNESLAW (IGNAZ) KOSZTOVITS, a subject of the Emperor of Austria-Hungary, and a resident of St. Petersburg, Russia, have invented an Improved Gas-Engine, (for which I have obtained Letters Patent in Great Britain, No. 8,273, dated June 6, 1888,) of which the following is a specification.

This invention has reference to engines worked by explosion and expanding of benzine, naphtha, petroleum, lighting-gas, or other combustible substances.

Figure 1:
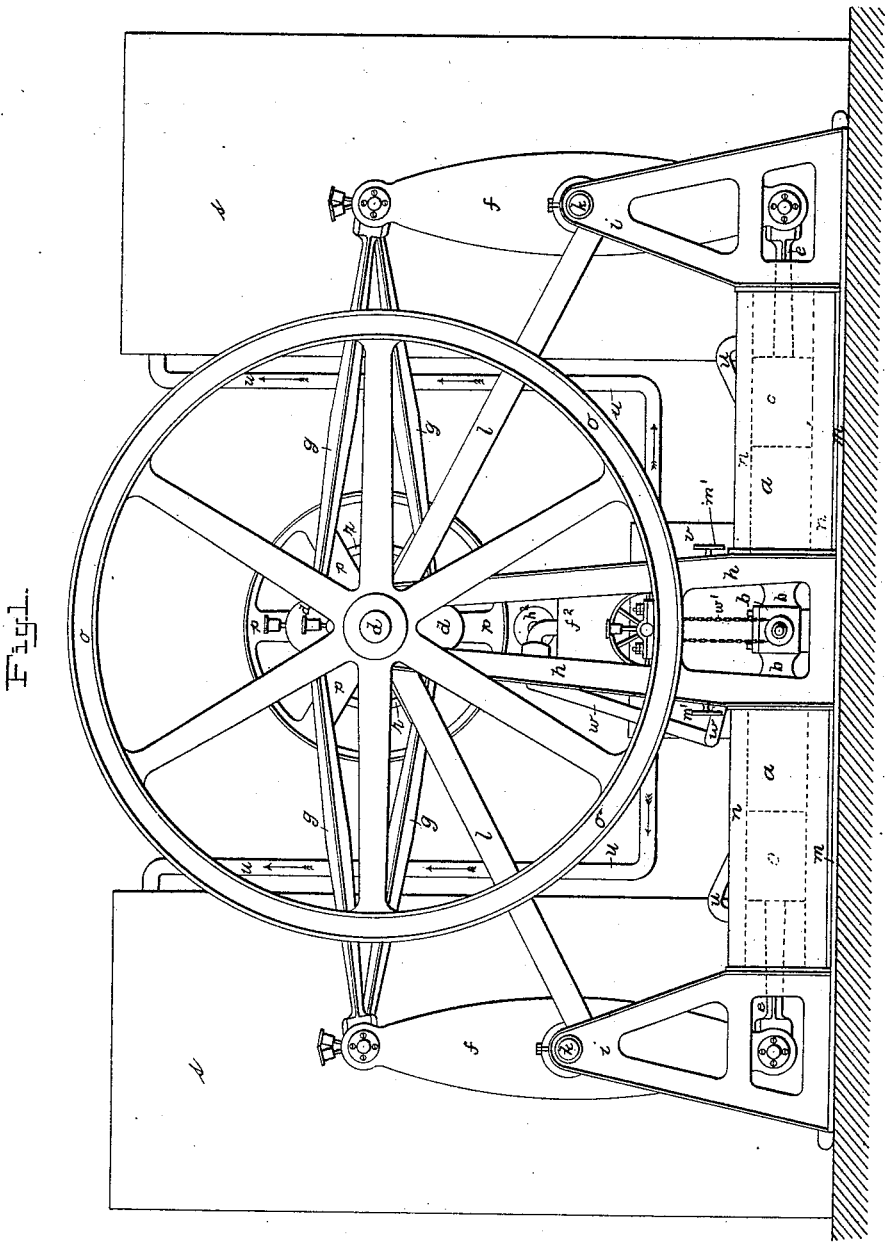
Figure 2:
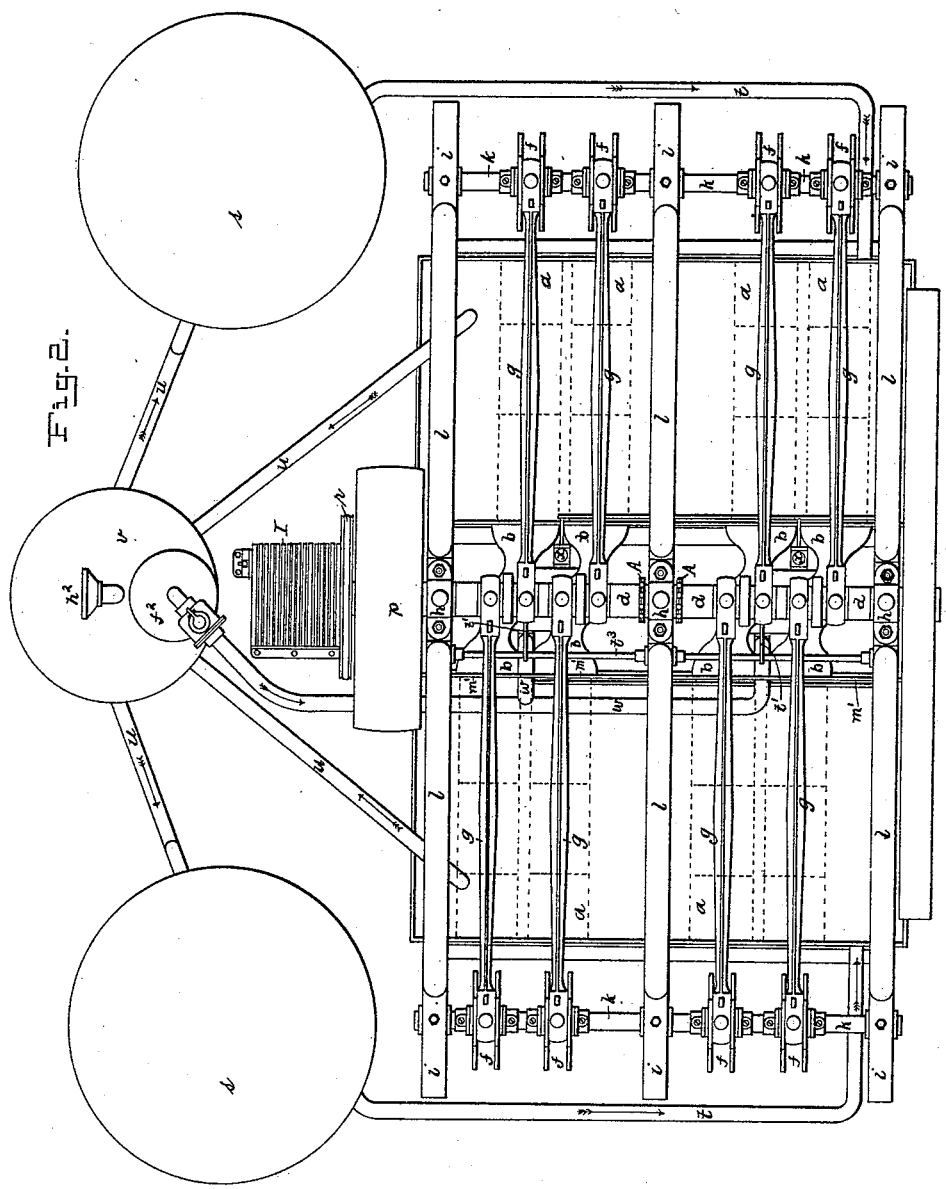
Figure 3:
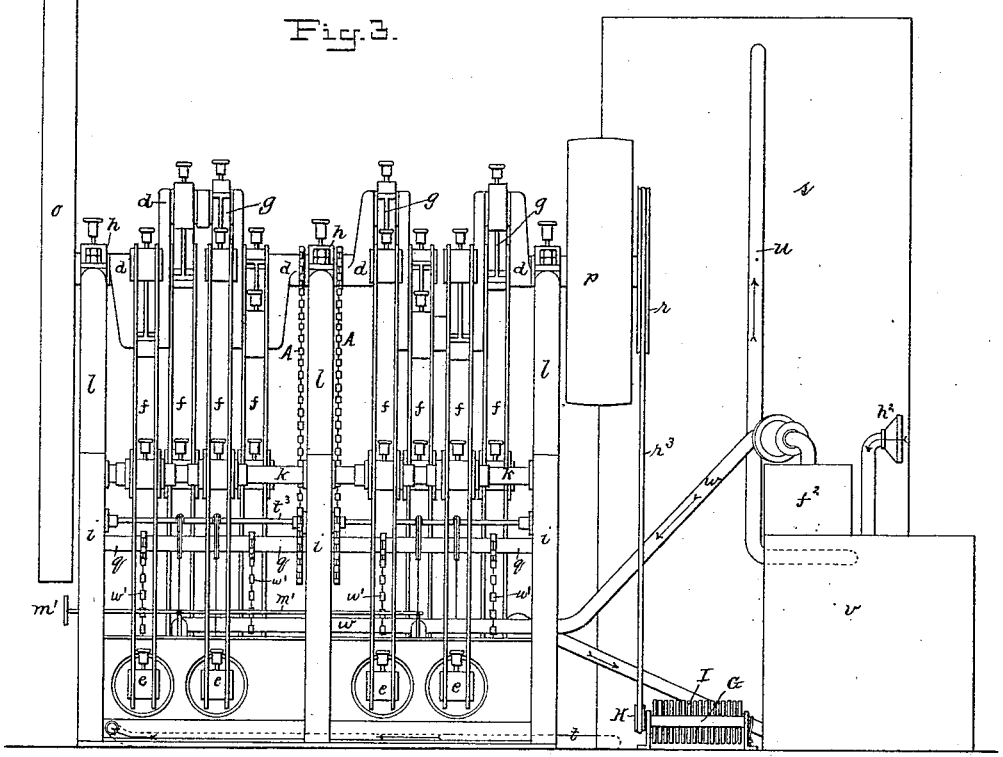
Figure 4:
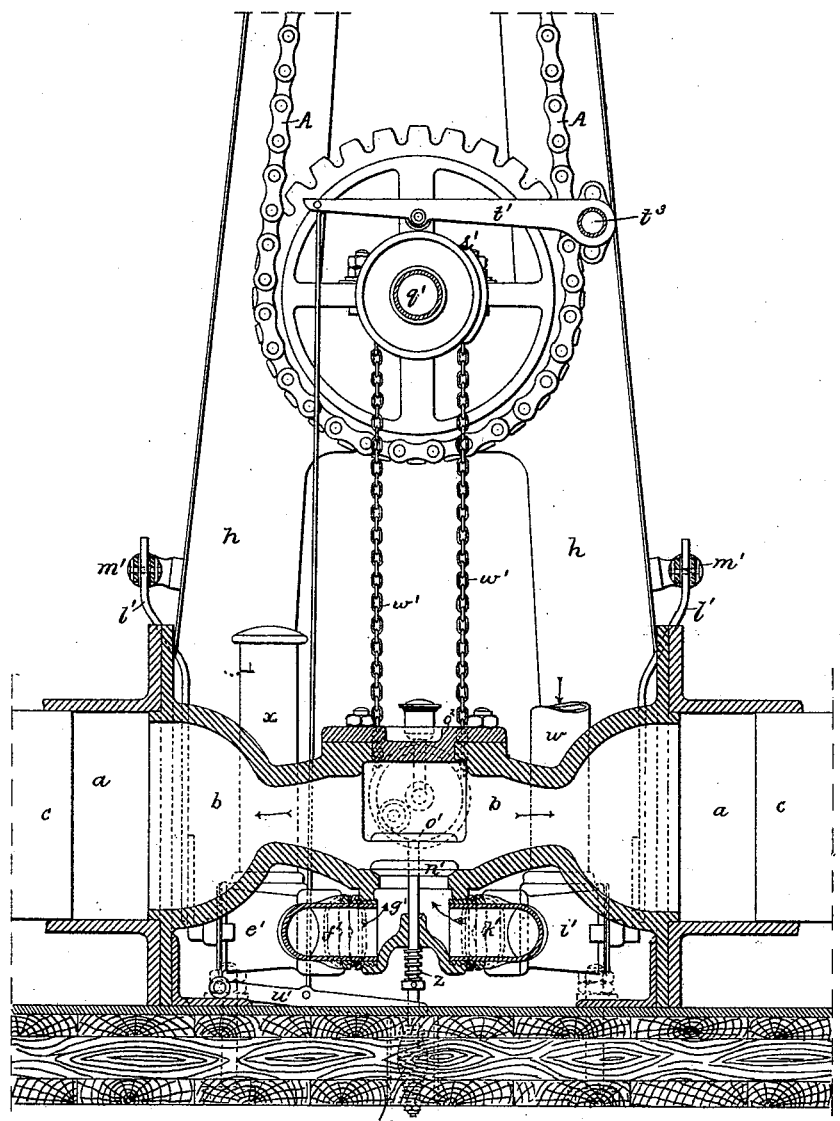
Figure 7:
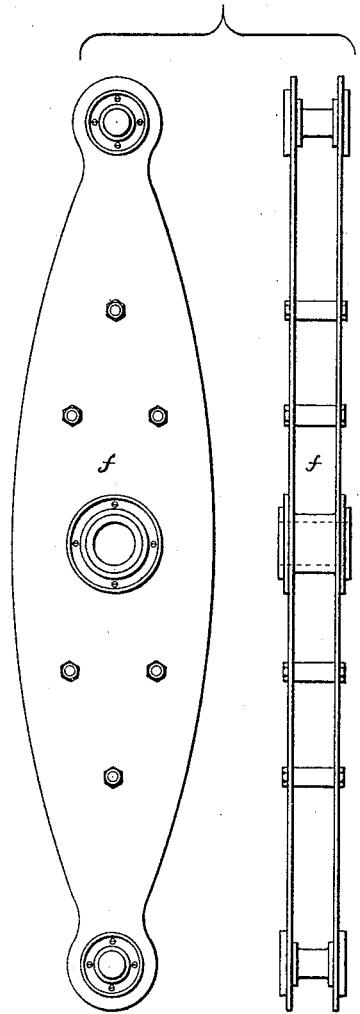
Figure 8:
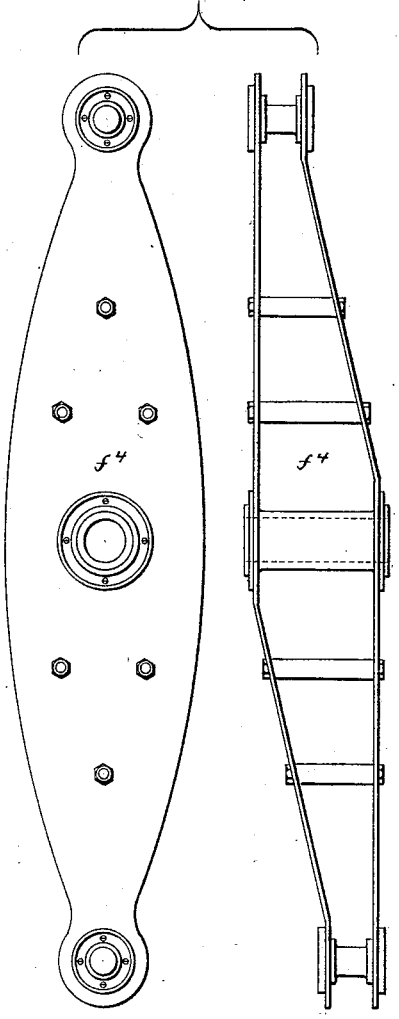

In the accompanying drawings, Figure 1 is a front view. Fig. 2 is a plan, and Fig. 3 is a side view, of my improved gas-engine. Fig. 4 is an enlarged sectional detail view. Fig. 5 is a plan view, and Fig. 6 a front view, of a modified arrangement of the cylinders; and Figs. 7 and 8 are enlarged details thereof. Figs. 9, 10, 11, 12, and 13 are detail views of the electrical igniting apparatus. Fig. 14 is a view of a modification thereof. Figs. 15 and 16 represent the gas-generators.

Four cylinders $a$, Figs. 1 and 2, are shown in dotted lines on both sides of the engine, but any number may be used. The two opposite cylinders of each pair are connected by an exploding-chamber $b$, as shown more clearly in Fig. 4, and thus represent a single cylinder with two pistons $c$ acting in opposite directions. The gases expand into both cylinders from the exploding-chamber $b$, and the piston-stroke is transmitted to the crank-shaft $d$ of the engine by the piston-rods $e$, which are connected with the walking-beams $f$, and these latter with the connecting-rods $g$. The piston-rods $e$ are jointed to the pistons $c$ by ball-and-socket or other suitable joints. The crank-shaft $d$ is journaled in pillow-blocks $h$ and the beam-shafts $k$ are journaled in pillow-blocks $i$. The journals are strengthened by beams $l$ or any other solid connection. The cylinders $a$ help to strengthen these bearings and also render the bed-plate $m$ firm. Each cylinder $a$ has a water-jacket $n$ surrounding it. The exploding-chambers are double-walled for the passage of cooling-water between the walls. A fly-wheel $o$ is fixed to one end of the crank-shaft $d$ and a pulley $p$ to the other end. In very powerful engines fly-wheels may be fixed to both ends of the crank-shaft and the pulley placed at the center of the engine; but where more than four cylinders are used the fly-wheel may be done away with altogether.

In powerful engines a friction-clutch is required for the pulley, so as to facilitate the starting of the engine by hand. A rope $r^3$, passing over a drum $r$ on the crank-shaft, rotates the armature of the electric generator, thus producing the electric current for igniting the gases in the exploding-chambers. Two coolers $s\ s$ are connected with the cooling-chambers between the cylinders $a$ and their jackets $n$ by pipes $t$ and $u$. The cold water enters by pipes $t$ and the warm water is conducted off by pipes $u$. The gas is supplied to the engine through a pipe $w$, and the air through the pipes $x$. The gas-pipe $w$ has a safety-valve to prevent explosions in the pipe. The cranks to which the pistons of each pair of cylinders are connected are arranged at one hundred and eighty degrees to each other.

The exploding-chamber $b$, Fig. 4, is constructed with conical contractions on both sides enlarging to semi-globular portions, which close the ends of the cylinders. A mixing-chamber $g'$ is situated immediately below the exploding-chamber $b$, into which air is admitted through the pipe $x$ and cock $e'$ and pipe $f'$. Gas or other exploding substance is admitted through the pipe $w$, cock $i'$, and pipe $k'$. The cocks $i'$ and $e'$ are operated by levers $l'$, which are controlled by transverse rods $m'$, Figs. 1, 3, and 4. The opening from the mixing-chamber $g'$ to the exploding-chamber $b$ is fitted with a valve $n'$. At the back of the chamber $b$ is an outlet fitted with a valve $o'$ for discharging the products of combustion. A shaft $q'$ is journaled in the pillow-block $h$ and receives a rotary motion from the shaft $d$ by means of chains A. The circumference of the chain-pulley on the shaft $q'$ is twice that of the one on the shaft $d$, thus giving one revolution of the shaft $q'$ to two revolutions of the shaft $d$. This shaft $q'$ has cams $s'$, which raise levers $t'$, pivoted at $t^3$ to the blocks $h$. These levers are connected by wires or rods to the levers $u'$, which raise the discharging-valves $o'$ at the proper time, Fig. 4. Springs $v'$ in the bed-plate cause the valve to close again when the levers $t'$ are released from their cams. The valves $n'$ are opened by the suction of the pistons and are closed by springs $z$. Chains $w'$, passing over pulleys on the shaft $q'$, turn the contact-hammer of the electrical igniting apparatus, as hereinafter explained.

Figure 6:
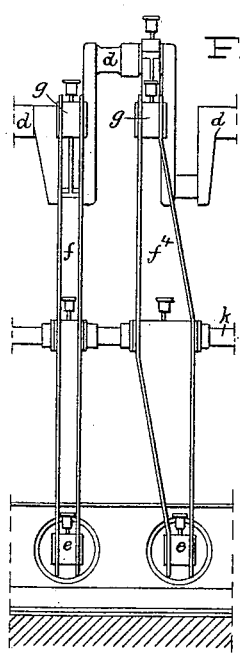

Figs. 5 and 6 (a plan and front view, respectively) represent a modification in which the double cylinders $a$ and their connecting-chamber $b$ are directly in line with each other, the walking-beams $f$ $f'$ at both ends of the cylinders being constructed alternately, one rectilinear $f$ and the other oblique $f^4$, as the connecting-rods are linked to the cranks on the shaft $d$ side by side.

Fig. 7 shows an enlarged section of a rectilinear walking-beam, while Fig. 8 is a similar view of an oblique one.

Figure 9:
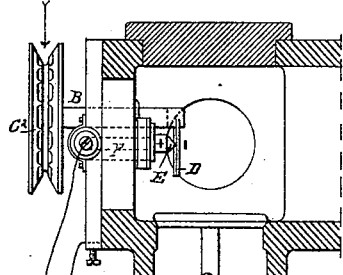
Figure 10:
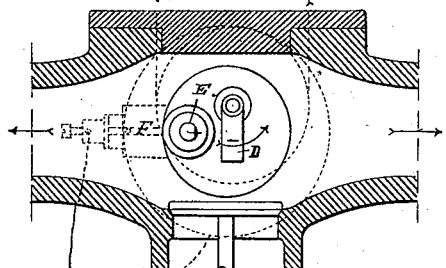

In Fig. 9 (an enlarged cross-section) and Fig. 10 (a horizontal section of the chamber $b$) is shown the igniting apparatus. The contact-hammer D, connected to one pole of the generator, is turned by means of the shaft B, pulley $c^2$, and chain $w'$, Fig. 4. The contact-pin E, fastened to two insulated pins F, is connected to the other pole of the generator, and by the intermittent making and breaking of contact with the hammer D an electric spark is produced to ignite the compressed combustible gases at the proper moment.

Figure 11:
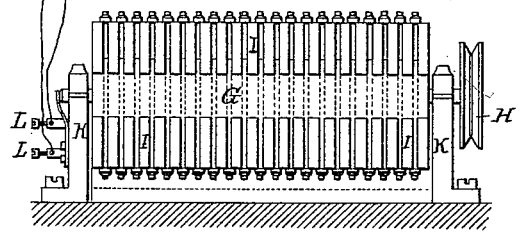
Figure 12:
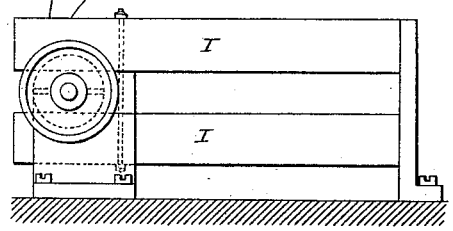
Figure 13:
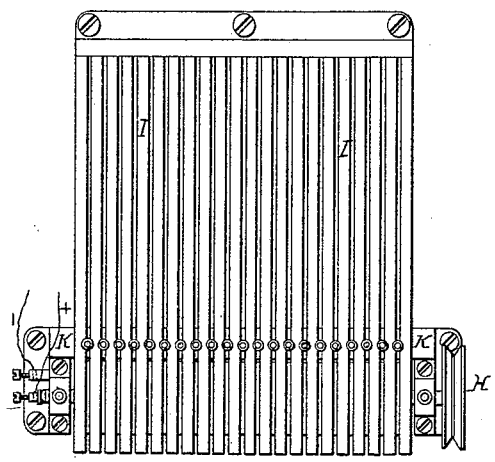
Figure 14:
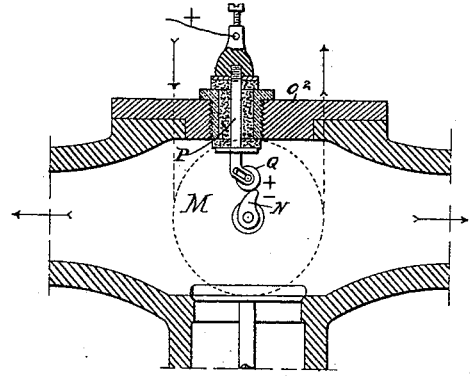

The electric-current generator is represented in Figs. 11, 12, and 13, (a longitudinal side and plan view, respectively,) in which I are the field-magnets and G is the armature, which is journaled in the blocks K and rotated through the medium of the pulley H, rope $r^3$, and drum $r$ on the crank-shaft $d$, Fig. 3. L L are binding-posts, to which are attached the wires running to the contact-hammer D and pin E, Figs. 9 and 10.

Fig. 14 shows another means for producing the igniting-spark in the exploding-chamber. In the wall M of the chamber turns a shaft, with the contact-hammer N fixed to it. An insulated pin P, bent at its inner end, passes through any part of the wall, or, as shown, through the cover $o^2$. In a slot in the bent end of this pin is a wheel Q, which can rise and fall to a limited extent in this slot. As the contact-hammer N strikes this wheel, the latter is pushed up to allow the hammer to pass. This gives it a rotary motion, and when the hammer passes it rolls down the inclined slot to its former position.

Fig. 15 shows a gas-generator which may be used, and which consists of a double-walled tank $v$ and a reservoir $f^2$ above the tank. This reservoir $f^2$ is provided with two perforated plates, between which gravel or broken stone is placed. An inlet $e^2$ is for the admission of benzine, petroleum, or other like substance. As the gases are sucked out through the pipe $w$ by the action of the engine to which the gas is supplied, air is drawn in through the funnel $h^2$ (which is provided with a dust-net) and through the pipe $i^2$, and is broken up by a fine net $k^2$ in the bottom of the tank. As the air passes up through the liquid it becomes saturated with gases, and then passes out through the reservoir $f^2$. The liquid taken up drips back from the stone into the tank. To admit of a greater development of gas, the waste hot gases from the engine may be allowed to pass through the spaces between the two walls of the tank, $c^3$ being the entrance and $d^3$ the outlet for these waste gases. If the heating becomes too great, the gases are led off through a branch pipe.

A modification of this reservoir is shown in Fig. 16, where the hot waste gases pass through a coil of pipe $b^3$ in the tank.

Instead of applying the waste gases for heating the gas-producing liquid, the hot water from the cylinders may be utilized for this purpose on its way to the coolers; and, again, the gas-generator may be used as both gas-generator and cooler at the same time—that is, the gas-producing liquid may be used to cool the cylinder and then pass into the reservoir $v$ and be there converted into gas, after having been heated by the cylinders.

The gas-generators are provided with thermometers to show the temperature of the liquid within.

The engine works as follows: To start the engine, the pistons are moved to the outward position of their strokes, thus drawing the gas through the valve $n'$ into the exploding-chambers $b$ and the cylinders $a$. The pistons are then returned to their inward positions, the valve $n'$ being closed. The gases in the two opposite cylinders $a$ are compressed into the exploding-chamber $b$. At this moment the electric spark is produced and ignites the combustible gases, which thus explode and expand into the cylinders, driving the pistons out. The valve $o'$ is now opened automatically, as before described, and the returning pistons drive out the burned gases. This valve is closed when the pistons reach the end of their inward movement, and as the pistons move out again the valve $n'$ opens, so that gas and air enter the chamber $b$ and cylinders $a$, in which they are compressed by the return movement of the pistons and then ignited as before. The valve $o'$ is opened and ignition takes place once for every second revolution of the crank-shaft, the valve opening at one revolution and the ignition taking place at the next, and so on, in each exploding-chamber.

The general arrangement of this engine, as above described, gives a complete balance to the moving parts, so that there will be no shocks. The situation of the cylinders gives a firm foundation without requiring a heavy bed-plate. The engine works regularly and quietly.

I claim as my invention—

1. In a gas or other engine, the combination of two cylinders containing pistons with an intermediate exploding-chamber connecting the two cylinders, and an electric igniting device contained within this intermediate explosion-chamber, substantially as herein set forth.

2. In a gas or other engine, the combination of two cylinders with an intermediate exploding-chamber provided with an igniting device therein, and inlet and outlet valves, said chamber enlarging at each end into a semi-globular shape, forming the end of the cylinder, substantially as set forth.

3. In a gas or other engine, the combination of two cylinders in line with each other, an exploding-chamber between them, with pistons, piston-rods, and a crank-shaft, connecting-rods, and walking-beams connecting the piston-rods with the crank-shaft, one of the walking-beams being straight and the other oblique, as and for the purposes set forth.

In testimony whereof I have signed my name to this specification in the presence of two subscribing witnesses.

OGNESLAW KOSZTOVITS.

Witnesses:
PETER JOHNSON,
JAMES FRESHOELK.